(No Model.) 2 Sheets—Sheet 1.
R. LUNDELL.
ALTERNATING CURRENT MOTOR.
No. 516,213. Patented Mar. 13, 1894.
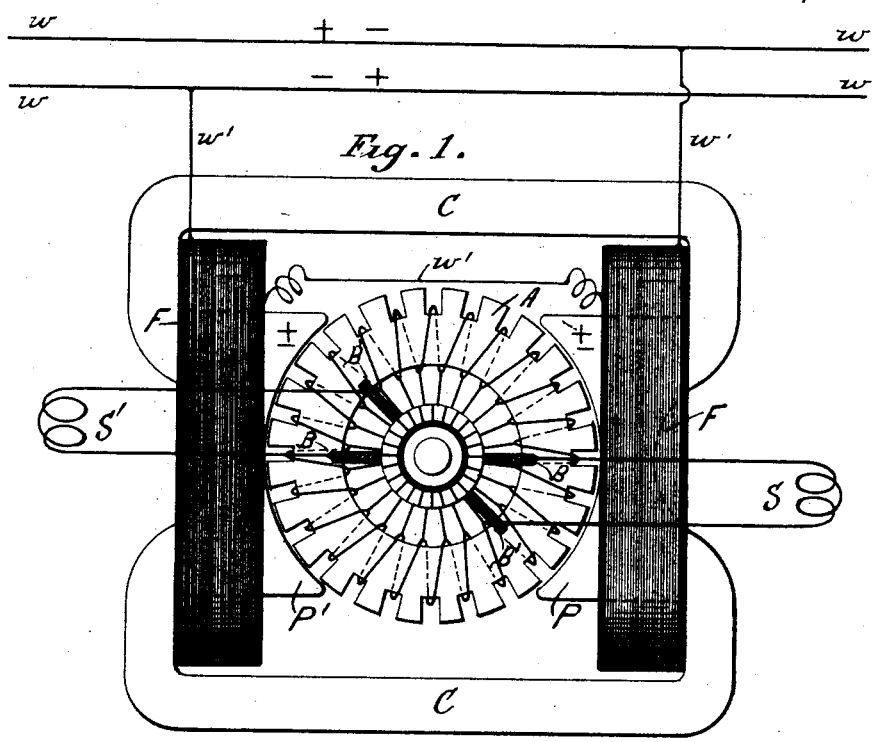
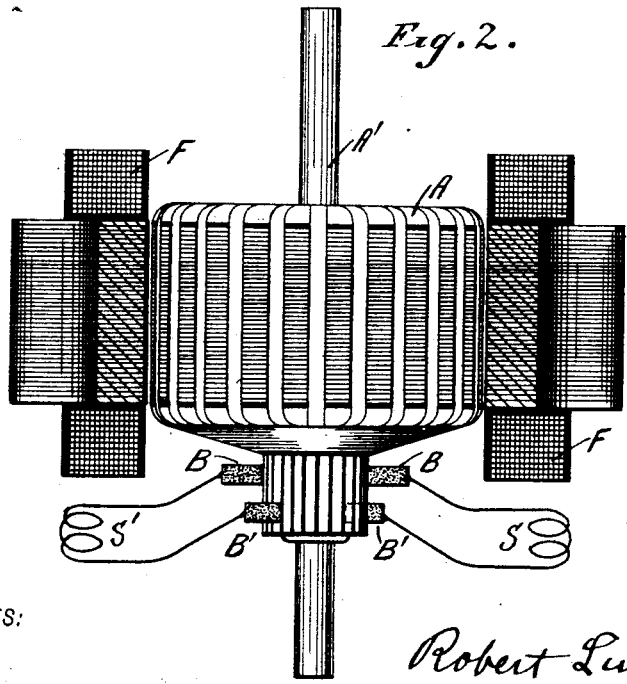
WITNESSES:
INVENTOR
Robert Lundell
BY
Charles J. Kintner
ATTORNEY.

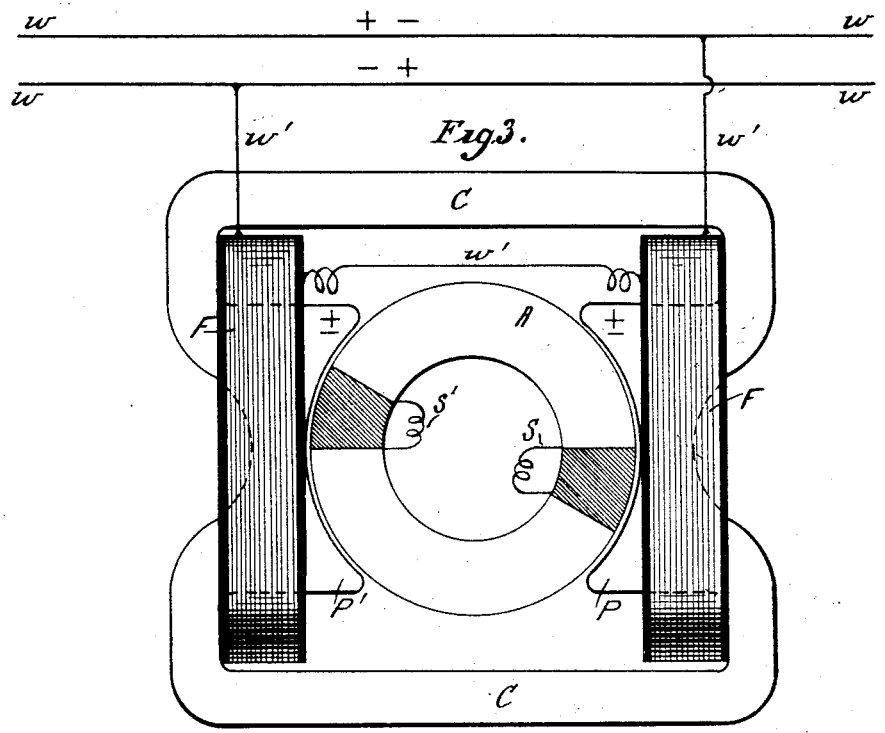
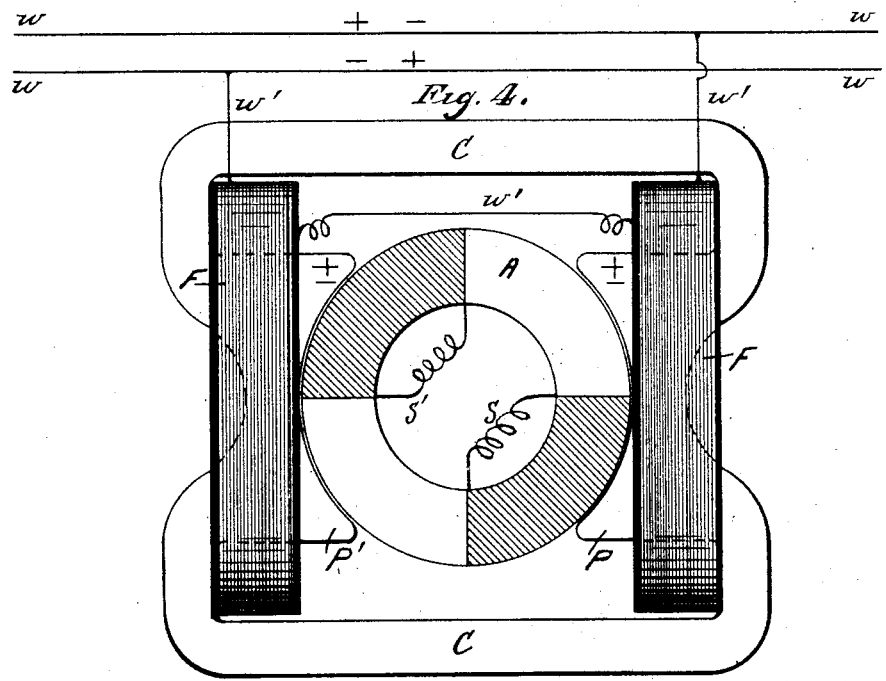

UNITED STATES PATENT OFFICE.

ROBERT LUNDELL, OF BROOKLYN, ASSIGNOR OF TWO-THIRDS TO EDWARD H. JOHNSON, OF NEW YORK, N. Y.

ALTERNATING-CURRENT MOTOR.

SPECIFICATION forming part of Letters Patent No. 516,213, dated March 13, 1894.

Application filed July 30, 1892. Serial No. 441,653. (No model.)

*To all whom it may concern:*

Be it known that I, ROBERT LUNDELL, a citizen of the United States of America, residing at Brooklyn, in the county of Kings and State of New York, have invented certain new and useful Improvements in Electric Motors, of which the following is a specification.

My invention relates especially to that type of apparatus known in the art as alternating current electric motors, and it has for its objects, first the construction of a motor of this type which shall be self-starting either with or without a load: second the regulation of the magnetic torque or pull upon the rotary or movable part in accordance with the demands made upon that part in the application of power: third the provision of means for reversing the direction of the rotary or movable part as desired: fourth the accomplishment of any and all of the results which are necessarily attributable to the methods of operation and apparatus hereinafter described and particularly claimed in the claims at the end of this specification. I accomplish the aforesaid objects by the practice of the methods and with the aid of the improved apparatus hereinafter described and fully illustrated in the accompanying drawings.

Figure 1 represents a side elevational view of a motor embodying the principles of my improvement, the field coils of said motor being connected directly in circuit with a pair of current mains, while Fig. 2 is a plan view thereof, the field coils and cores being shown in section. Figs. 3 and 4 are diagrammatic views of the same machine illustrating respectively the operative condition of affairs in the armature circuit attributable to different locations of the current collecting brushes.

It is a well known fact that if an electric conductor be closed upon itself and located in the magnetic field of the core of an electromagnet through the coils of which alternating currents of electricity are passed, this closed circuit will tend to be repelled from the pole of the magnet so long as it remains in a plane parallel with that pole or at right angles to the magnetic lines of force and also that if said closed conductor be slightly tilted in any direction it will immediately tend to set up a motion about the axis around which it is tilted and to place itself in a plane parallel with the axis of the core or coincident with the magnetic lines of force emanating therefrom. In other words, the instant that this closed circuit is tilted about a given axis, the magnetic lines of force act inductively upon the conductor and a certain amount of energy is consumed in causing the conductor to change its angular position with relation to the magnet pole. Upon the application of this generic principle my invention is based.

I am aware that it is not broadly new with me to utilize the inductive effects of one or more stationary field magnet coils upon a rotary armature provided with short circuit connections between the opposite ends of any single coil or single pair of coils in such manner that the armature is caused to rotate under the application of induced currents upon such coil or coils and that as the armature rotates said coil or coils will tend to be placed in a plane parallel with or coincident with the magnetic lines of force. Although my invention involves the application of this generic principle, I make no claim broad enough to include such a structure or mode of operation.

My invention will be fully understood by referring to the accompanying drawings in all of which like letters of reference represent like parts wherever used.

$w$ $w$ are current mains running to a distant alternating current generator not shown, said mains being connected directly by a conductor $w'$ to the field magnet coils F F of my improved motor, C being the laminated field magnet core thereof having inwardly projecting pole pieces P P'.

A is the armature made of laminated toothed disks carried by the axis A' and wound as shown, after the manner of a Gramme armature, each section of which is connected to an individual commutator strip in the usual way.

B B are stationary current collecting brushes permanently secured in alignment with the central or axial line of the field magnet poles P P' as shown in Fig. 1, their inner ends resting directly upon the commutator, while their outer ends are connected to shunt circuits S S' of low resistance, which in turn are connected to the outer ends of a pair of independent movable current collecting brushes B' B' carried by the usual form of brush rocker or holder, not shown, but adapted to permit of the rotation of said brushes into any position. These movable brushes B' B' and their rocker or carrier are located just outside the fixed brushes B B so that they may be rotated to any desired position and in either direction at will, as will be apparent on inspection of Fig. 2.

The operation of the apparatus is as follows: Suppose the brushes B' B' in Figs. 1 and 2 be shifted to the left until they are parallel with or in the same plane with the brushes B B. Under this condition of affairs if an alternating current is set up in the mains $w$ $w$ and the field coils F through the conductor $w'$, the armature A would not rotate inasmuch as the inductive effect upon all of the coils on both sides is identical, none of them being short circuited. Should the brushes B' B' now however be shifted forward in the direction toward which they appear in Figs. 1 and 2, the instant that they rest upon the next commutator sections in advance of those upon which the stationary brushes B and B are resting, the first coil of the armature A on the left above the brush B will be short circuited through the low resistance conductor S' and in like manner that coil of the armature on the right below the corresponding brush B will be short circuited through the low resistance coil S. By virtue of these two short circuited coils therefore, there is at once set up in the armature A, a tendency to rotate from right to left. As the brushes B' B' are advanced in the direction shown in Figs. 1 and 2 the successive coils of the armature A above the left hand brush B and the like coils below the right hand brush B will be short circuited through the low resistance conductors S' and S, thus placing an increased number of short circuited coils under the influence of the field poles P' P, a maximum effect being reached when those brushes stand approximately at right angles to the brushes B B. By rotating the brushes B' B' in the reverse direction from the starting point it is apparent that the armature will rotate in the opposite direction, thus furnishing a ready and efficient means of changing the direction of the applied power.

I have illustrated in Figs. 3 and 4 the relative torque effects due respectively to the location of the movable brushes in the first instance at a point about thirty degrees from the stationary brushes, and in the second instance at a point ninety degrees distant from said brushes, the relative effects being indicated by the shaded surfaces upon the armatures A, those shaded portions representing also the actual proportion of armature coils which are short circuited by the brushes B B, B' B' through the coils S and S' for the positions above indicated. It will be understood therefore that by this method of setting up an increasing inductive field in the armature through the agency of short circuited coils, I am enabled to vary the magnetic pull or torque in accordance with the demand or load, and also that I obtain a self-starting armature in which the means of applying the inductive effects are adapted not only to vary the current supply in accordance with the load to be moved but also to avoid damaging effects upon the machine itself by virtue of the choke coil action of the motor which is obvious in view of the nature of its construction.

I do not limit myself to any special structure of armature such as that herein shown and described. In fact I should prefer to use what is known as a cylindrical or barrel type of armature core with laminated toothed disks, as with such a core a more perfect magnetic circuit would be maintained between the field poles. I have herein illustrated and described the structure as having an armature of the Gramme type for the reason that the circuit connections can be much more easily illustrated with such a type of armature. Nor do I limit myself to the special form of two pole motor herein shown and described, it being apparent that the novel principle hereinbefore described may be practiced equally as well with multipolar machines. With machines of the multipolar type however there would be required two pairs of brushes for each pair of poles, unless the armature be of the well known cross connected type in which event there need be only two pairs of brushes for any number of poles.

Having thus described my invention, what I claim, and desire to secure by Letters Patent of the United States, is—

1. An alternating current motor provided with a pair of stationary inducing field coils and a movable or rotary armature provided with a series of coils having their free ends attached to a current collecting device in combination with fixed and movable pairs of current collecting brushes and shunt circuits connecting said brushes together in pairs as described.

2. An alternating current motor having a pair of current collecting brushes, one fixed and the other movable with a conductor connecting said brushes; the movable brush lying in a different plane from and adapted to be rotated past the fixed brush as described.

3. In an alternating current motor two fixed and two movable brushes connected in pairs, the movable brushes being located in a plane substantially parallel with the fixed brushes and adapted to rotate past them in either direction at will, substantially as described.

4. An alternating current motor having stationary and movable current collecting brushes bearing on a commutating device, the movable brushes having rotation about the fixed brushes in either direction at will, substantially as described.

5. An alternating current motor having two or more field magnet poles, a rotary armature having a series of coils connected to a common current collector, a single pair of fixed current collecting brushes and a like pair of movable current collecting brushes and shunt conductors joining said fixed and movable brushes in pairs as described.

6. An alternating current motor having two or more inducing or field magnet poles, a rotary armature having a magnetic core surrounded by a series of secondary coils connected to a common current collecting device, a pair of fixed or stationary current collecting brushes located in alignment with the axial center of each pair of inducing poles and a corresponding pair of movable current collecting brushes for each pair of poles, said fixed and movable brushes being connected together in pairs as described.

ROBERT LUNDELL.

Witnesses:
C. J. KINTNER,
M. M. ROBINSON.